Patented Jan. 14, 1941

2,228,924

UNITED STATES PATENT OFFICE 2,228,924

MANUFACTURE OF 4-CHLORO-5-NITRO-1-NAPHTHOMETHYLCHLORIDE

Hans Lange and Otto Hoffmann, Dessau in Anhalt, Germany, assignors to General Aniline & Film Corporation, a corporation of Delaware No Drawing. Application June 3, 1939, Serial No. 277,262. In Germany June 4, 1938

2 Claims. (Cl. 260—646)

The present invention relates to a process for manufacturing 4 - chloro - 5 - nitro - 1 - naphthomethylchloride and to the product thus obtainable.

Various processes are already known for chlorinating the 1-nitronaphthalene by causing the chlorine to act upon the fused 1-nitronaphthalene in the presence of chlorine carriers, such as ferric chloride, a mixture of 1,5-nitrochloronaphthalene and 1,8-nitrochloronaphthalene being produced thereby. By this method of operating it is, however, not possible to chlorinate in the nucleus chloromethylated nitronaphthalene, obtainable according to U. S. Patent No. 2,133,389; only resinification products are obtained by this procedure.

The present invention is based on the observation that chlorination in the nucleus of the 1'- chloro-1-methyl-5-nitronaphthalene occurs readily and in a good yield by causing elementary chlorine to act in the presence of halides of antimony upon the 1'-chloro-1-methyl-5-nitronaphthalene dissolved in trichlorinated hydrocarbons, such as chloroform, trichlorethane, trichloroethylene and trichlorobenzene; during this operation a uniform 4-chloro-5-nitro-1-naphthomethylchloride is obtained in the form of a crystalline product.

The chlorination in the nucleus of nitrated aralkylhalides has hitherto not been described; the ready course of the chlorination process of the 1'-chloro-1-methyl-5-nitronaphthalene is the more remarkable and the more surprising, as a chlorination in other solvents such as glacial acetic acid, carbon tetrachloride, tetrachloroethane, orthodichlorobenzene or nitrobenzene is substantially unserviceable and as other chlorine carriers such as iodine or ferric chloride cannot be used.

For obtaining good industrial yields of the 4-chloro-5-nitro-1-naphthomethylchloride it is not necessary to start from pure 1'-chloro-1-methyl-5-nitronaphthalene. On the contrary, the crude chloromethylation product obtainable according to the method of operating described in U. S. Patent No. 2,133,389 may be dissolved in chloroform and the like and the solution may be chlorinated immediately in the manner described.

The 4-chloro-5-nitro-1-naphthomethylchloride constitutes a new and valuable intermediate product for making dyes.

The following examples illustrate the invention, the parts being by weight:—

Example 1.—664.5 parts of 1'-chloro-1-methyl-5-nitronaphthalene are dissolved in 1116 parts of dry chloroform. 7.5 parts of antimony trichloride are added and, while stirring, 700 parts of chlorine are introduced in the course of 8 hours; during this operation the initial temperature of 55° C. to 60° C. is gradually decreased to 45° C. to 50° C. The mixture is then stirred for some hours without heating and the crystalline mass which has precipitated is then filtered with suction. As a washing liquid it is advantageous to use methanol to which some chloroform has been added. After drying, 513 parts or 4-chloro-5-nitro-1-naphthomethylchloride are obtained in the form of a pure and uniform product which melts at 130° C. to 131° C. The yield amounts to 66.8 per cent. of the theoretical yield.

Instead of chloroform there may be used with the same good success trichloroethane or trichloroethylene.

Example 2.—865 parts of 1-nitronaphthalene are chloromethylated, as described in U. S. Patent No. 2,133,389, by means of formaldehyde and hydrochloric acid in the presence of zinc chloride. About 1500 parts of chloroform are then added to the mixture and after the whole has been vigorously stirred, the chloroform solution is separated from the zinc chloride solution. After the addition of 7.5 parts of antimony trichloride 790 parts of chlorine are introduced, as described in Example 1, into the dried chloroform solution. There are obtained 680 parts of 4-chloro-5-nitro-1-naphthomethylchloride, that is 53 per cent. of the theory, calculated upon the quantity of the starting material used.

Example 3.—222 parts of 5-nitro-1-naphthomethylchloride are dissolved in 586 parts of 1,2,4-trichlorobenzene. After the addition of 2.5 parts of antimony trichloride, 250 parts of chlorine are introduced into the solution in the course of about 4½ hours, while stirring; during this operation the initial temperature of 60° C. is decreased after 3 hours to about 50° to 55°. The mixture is then cooled for 1 to 2 hours on ice, while stirring, filtered by suction and washed first with trichlorobenzene and finally with methanol. There are obtained 165 parts of 4-chloro–5-nitro - 1 - naphthomethylchloride (64.4 per cent. of the theory) of the same condition as that of Example 1.

As mentioned above, 4-chloro - 5 - nitro-1-naphthomethylchloride is a valuable intermediate product for the manufacture of dyes. Thus, for instance, by a treatment with sulfurizing substances valuable sulfur dyes are obtainable. When boiling it with a bisulfite the corresponding ω-methylsulfonic acid is formed which may be reduced in order to obtain the 4-chloro-5-aminonaphthomethylsulfonic acid, which is the starting material for azo dyes.

What we claim is:

1. The process which comprises acting with chlorine in the presence of a halide of antimony upon 1'-chloro-1-methyl-5-nitronaphthalene dissolved in a trichlorinated hydrocarbon of the group consisting of chloroform trichlorethane, trichloroethylene and trichlorobenzene.

2. 4-chloro-5-nitro-1-naphthomethylchloride.

HANS LANGE.
OTTO HOFFMANN.